United States Patent [19]
Taylor et al.

[11] Patent Number: 5,793,514
[45] Date of Patent: Aug. 11, 1998

[54] OPTICAL SCANNER FOR FINITE CONJUGATE APPLICATIONS

[75] Inventors: William H. Taylor, South Deerfield; Thaddeus J. Strzempko, Westfield, both of Mass.

[73] Assignee: Kollmorgen Corporation, Northampton, N.Y.

[21] Appl. No.: 879,694

[22] Filed: Jun. 18, 1997

Related U.S. Application Data

[62] Division of Ser. No. 655,320, May 24, 1996, Pat. No. 5,680,243, which is a division of Ser. No. 380,010, Jan. 27, 1995, Pat. No. 5,557,447, which is a continuation-in-part of Ser. No. 320,421, Oct. 5, 1994, abandoned, and Ser. No. 252,925, Jun. 2, 1994, abandoned.

[51] Int. Cl.$^6$ ................................................. G02B 26/08
[52] U.S. Cl. ........................... 359/201; 359/203; 359/208; 359/212
[58] Field of Search .................................. 359/196–199, 359/201–203, 205–208, 212, 223, 226, 236, 618, 629, 639, 640, 558, 566, 831, 837, 850, 868, 869; 347/256, 260, 134; 358/296, 474; 250/234–236

[56] References Cited

U.S. PATENT DOCUMENTS

| | | | |
|---|---|---|---|
| 4,538,181 | 8/1985 | Taylor | 358/208 |
| 5,365,364 | 11/1994 | Taylor | 359/208 |

*Primary Examiner*—James Phan
*Attorney, Agent, or Firm*—Morgan & Finnegan, LLP

[57] ABSTRACT

An optical system providing a rotating scan disc including a circular array of concave reflectors on a planar surface thereof and imaging means adapted to coincide with the scanning sweep of the concave reflectors and separated from the concave reflectors by a distance equal to the focal length of the concave reflectors. A light source is provided to emit a light beam toward the circular array of concave reflectors to form an image redirected from the imaging means and the imaging means includes an objective mirror and a strip prism adapted to correct field curvature of the image. Additionally, means are provided to monitor the position of the light beam in both the scan and cross-scan directions and to reposition the light beam by movement of at least one optical component.

6 Claims, 9 Drawing Sheets

A single lens is suitable only for essentially

OPTICAL SCANNER FOR FINITE CONJUGATE APPLICATIONS

CROSS-REFERENCE TO RELATED APPLICATIONS

This is a divisional of application Ser. No. 08/655,320 filed May 24, 1996, now U.S. Pat. No. 5,680,243, which is a divisional of application Ser. No. 08/380,010 filed Jan. 27, 1995, now U.S. Pat. No. 5,557,447, which is a continuation-in-part of U.S patent application Ser. No. 08/320,421 entitled OPTICAL SCANNER FOR FINITE CONJUGATE APPLICATIONS, which was filed on Oct. 5, 1994, abandoned, in the name of William H. Taylor and U.S patent application Ser. No. 08/252,925 also entitled OPTICAL SCANNER FOR FINITE CONJUGATE APPLICATIONS, and filed on Jun. 2, 1994, abandoned, in the name of William H. Taylor.

The disclosure of these patent applications are incorporated herein in their entirety by reference.

BACKGROUND OF THE INVENTION

This invention relates to high speed optical scanners. More particularly, this invention relates to high speed optical scanners for use with finite conjugates and visible, ultraviolet, and infrared light.

Figure 11:
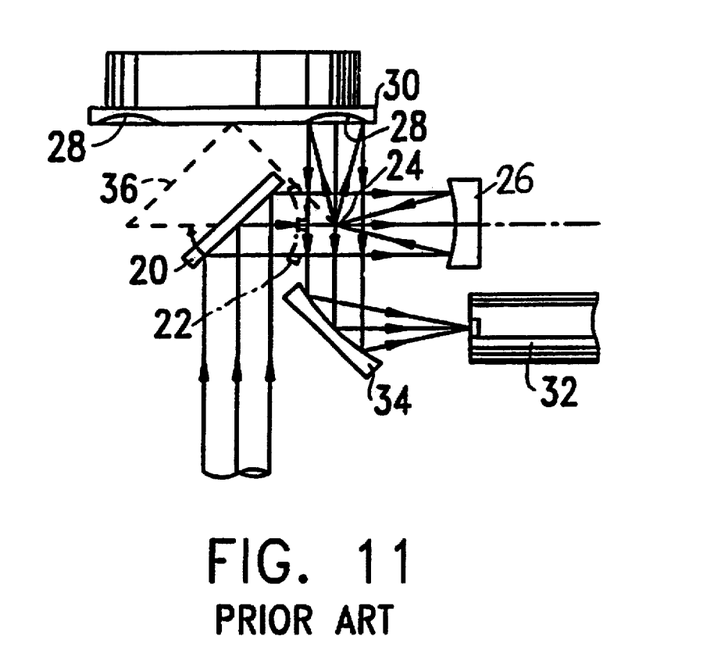
FIG. 11 shows a basic compact video rate optical scanner (CVROS)

A basic compact video rate optical scanner (CVROS) system is described in detail in U.S. Pat. No. 4,538,181 and is shown in FIG. 11. The disclosure of this patent is incorporated herein in its entirety by reference. In this system, incoming radiation from an image is reflected off a framing mirror 20 through a meniscus lens 22, past a strip mirror 24 to an objective mirror 26. The radiation is then focused on strip mirror 24 and reflected toward the concave reflectors 28 of rotating scan disc 30, from which it emerges as a collimated beam. The collimated beam passes the strip mirror and is focused on detector 32 by means of a collector reflector 34. A two dimensional raster scan may be obtained by oscillating framing mirror 20 located at the aperture stop and synchronized to the scan disc.

The curved strip mirror 24 is the exterior surface of a cone formed with a 45 degree half-angle and an axis which is coaxial with the axis of rotation for scan disc 30 as indicated by dotted lines 36. Objective mirror 26 is a concave mirror with a spherical contour having a radius equal to the distance from the vertex of framing mirror 20. The reflected image off objective mirror 26 lies on a spherical surface which is intercepted by curved strip mirror 24. The radius of curvature of the image is one-half the radius of curvature of objective mirror 26 and is equal to the scan disc radius $R_D$.

The CVROS scanner described in U.S. Pat. No. 4,538,181, however, suffers from significant limitations preventing its utilization in applications with finite conjugates and visible, ultraviolet, and infrared light. The CVROS scanner was originally developed for infrared applications. Consequently, all lens materials were made from material which transmits infrared radiation but not visible light, and are therefore inappropriate for applications in the visual spectrum.

For example, adaptation of the CVROS scanner for applications in the visible, ultra-violet or near infrared spectrums requires elimination of the germanium meniscus lens because of its spectral transmission limitations. This results in the need for a meniscus lens of a different material for the spectrum of interest, or to correct the spherical aberration by another means. A single lens is suitable only for essentially monochromatic applications. Broad spectral band applications would require an achromatic corrector lens which can correct chromatic aberration both on-axis and off-axis.

On-axis aberrations of the scanner are those which occur when the scan disc concave reflector is centered on the optical axis. Off-axis aberrations of the scanner are those which arise during the repositioning of the scan disc concave reflector as it rotates about the scan disc axis. With a perfectly symmetrical, monocentric system which includes the concentric curved image surface, the off-axis aberrations are identical to the on-axis aberrations. Thus, with respect to the off-axis imagery for applications which require a flat image, the well-corrected curved image must be transformed into a flat image while maintaining the high degree of correction present across the entire arc length of the curved image.

Figure 12:
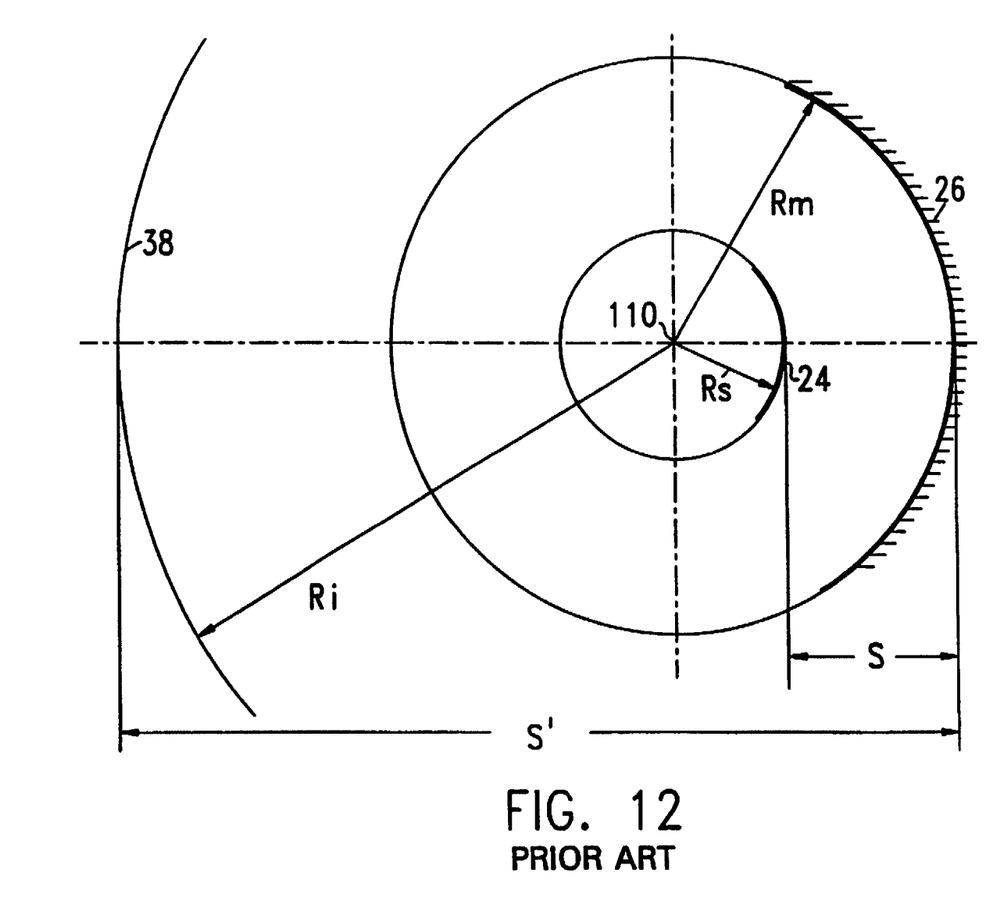
FIG. 12 shows the image surface associated with the CVROS scanner of FIG. 11.

Adaptation of the scanner to finite conjugate applications also requires dealing with the field curvature problem which arises. As is illustrated in FIG. 12, the image surface 38 (or object surface depending on application) for which the scanner retains its concentric form is spherical. In FIG. 12, Rm designates the objective mirror radius, Rs the strip mirror radius, and Ri the radius of the image. The image and object conjugates of the objective mirror are designated s' and s, respectively. For many applications, it is required that the scanner image onto a flat surface. Further, for applications in which the imaging medium or art work are located on a rotating drum or flat bed transport, the scanner need only produce a flat line scan and not a flat two-dimensional area scan.

SUMMARY OF THE INVENTION

With the foregoing in mind, it is an object of the invention to provide a high speed optical scanner for use with finite conjugates and visible, ultraviolet, and infrared light.

In accordance with the invention, a non-concentric objective mirror and a strip prism replacing the strip mirror are provided to achieve field flatness in high speed optical scanners. The coma exhibited by the non-concentric objective mirror and the strip prism are approximately equal in magnitude but opposite in sign and an optimum combination of non-concentric objective mirror radius and strip mirror cylinder radius may be chosen for different system magnifications. The resulting image remains well corrected for field curvature and is essentially free of coma.

Compensation for scan disc axis tilt or decenter via beam position monitoring in the scan direction can be achieved by providing a beam splitter and precision grating located parfocal to the strip mirror. As the beam traverses the precision grating, a clocking signal is generated which is characteristic of the system with all of its perturbations and which can be used to time the system electronic events in lieu of a fixed frequency clock. This beam position monitoring design can be extended to the cross-scan direction by utilizing two or more slightly non-parallel light beams generated, e.g., by two pin holes and a collimating mirror.

Sinusoidal cross-scan displacement errors due to disc axis tilt and decenter can also be eliminated by repositioning the beam at the same frequency and amplitude and with the correct phase relationship. The light beam may be repositioned by movement of an optical component, e.g., the strip mirror. The light beam can also be repositioned by changing its angle of incidence on the scan disc via a tipped plate located between a laser diode and a collimating lens.

BRIEF DESCRIPTION OF THE DRAWINGS

The accompanying drawings, referred to herein and constituting a part hereof, illustrate preferred embodiments of the invention and, together with the description, serve to explain the principles of the invention, wherein.

DETAILED DESCRIPTION OF THE DRAWINGS

To facilitate understanding of the invention as illustrated in the drawings, similar reference numerals will be applied to similar structures throughout the figures.

In accordance with the invention, two related designs to achieve field flatness in high speed optical scanners are presented; 1) a non-concentric objective mirror, and 2) a strip prism field flattener which replaces the strip mirror. These designs may be utilized separately or, as in a preferred embodiment, in combination.

The non-concentric objective mirror design to achieve field flattening provides that the image conjugate for an off-axis field point be lengthened by a slight increase in magnification for that point such that the image is formed on the tangent plane to the curved image instead of being formed on the curved image surface itself. The magnification increase is achieved by locating an objective mirror 26 of radius shorter than the basic CVROS scanner design, non-concentrically to the strip mirror 24 (FIG. 11). This results in a reduction in the length of the object conjugate for points off-axis, a reduction which increases progressively as the distance off-axis increases. The assumed object is the arc on the strip mirror defined by the intersection of the concave reflector focal point as it rotates across the strip mirror. While this design achieves field flatness beyond 60°, it exhibits coma which progresses steadily in magnitude as the distance off-axis is increased.

Figure 1:
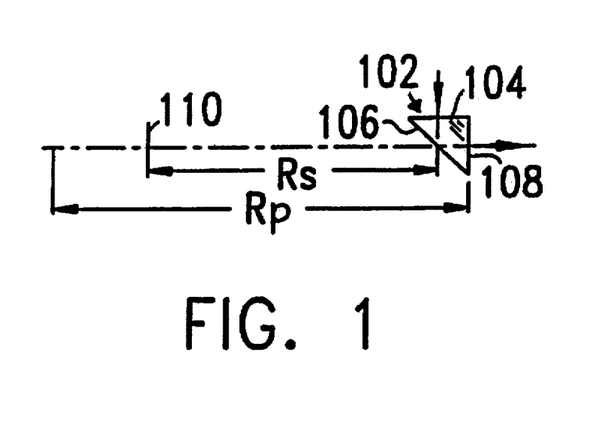
FIG. 1 shows a strip prism field flattener design in accordance with the invention.

In the strip prism field flattener design, the strip mirror 24 of FIG. 11 is replaced by a strip prism 102 of FIG. 1 which retains the same conical reflecting surface as the strip mirror, but which, in cross-section, resembles a 1.5 mm right angle (45°-45°-90°) prism. The entrance face 104 is plano, and is parallel to the plane of the scan disc. Reflective surface 106 is conical. The exit surface 108 of the prism is cylindrical, with the radius of curvature (Rp) of the exit surface being non-concentric with and substantially longer than the radius (Rs) of curvature of the reflective surface 106 of the prism so as to create a negative field flattening lens.

The introduction of this refractive component results in a small amount of axial chromatic aberration, $\lambda/4$ or less across the visible spectrum. More importantly, no lateral chromatic aberration exists. The strip prism also has the advantage that no large field mirror is required and its scan characteristic approximates $F \tan \Theta$ rather than $F \Theta$. However, while the strip prism arrangement achieves a high degree of field flattening, it also exhibits coma.

Advantageously, the coma exhibited by the non-concentric objective mirror and the strip prism are approximately equal in magnitude but opposite in sign and an optimum combination of non-concentric objective mirror radius and strip mirror cylinder radius has been found to exist for different system magnifications. The resulting image remains well corrected for field curvature, but is now essentially free of the coma which exists in designs that may rely on either the non-concentric objective mirror or strip prism alone.

Figure 2:
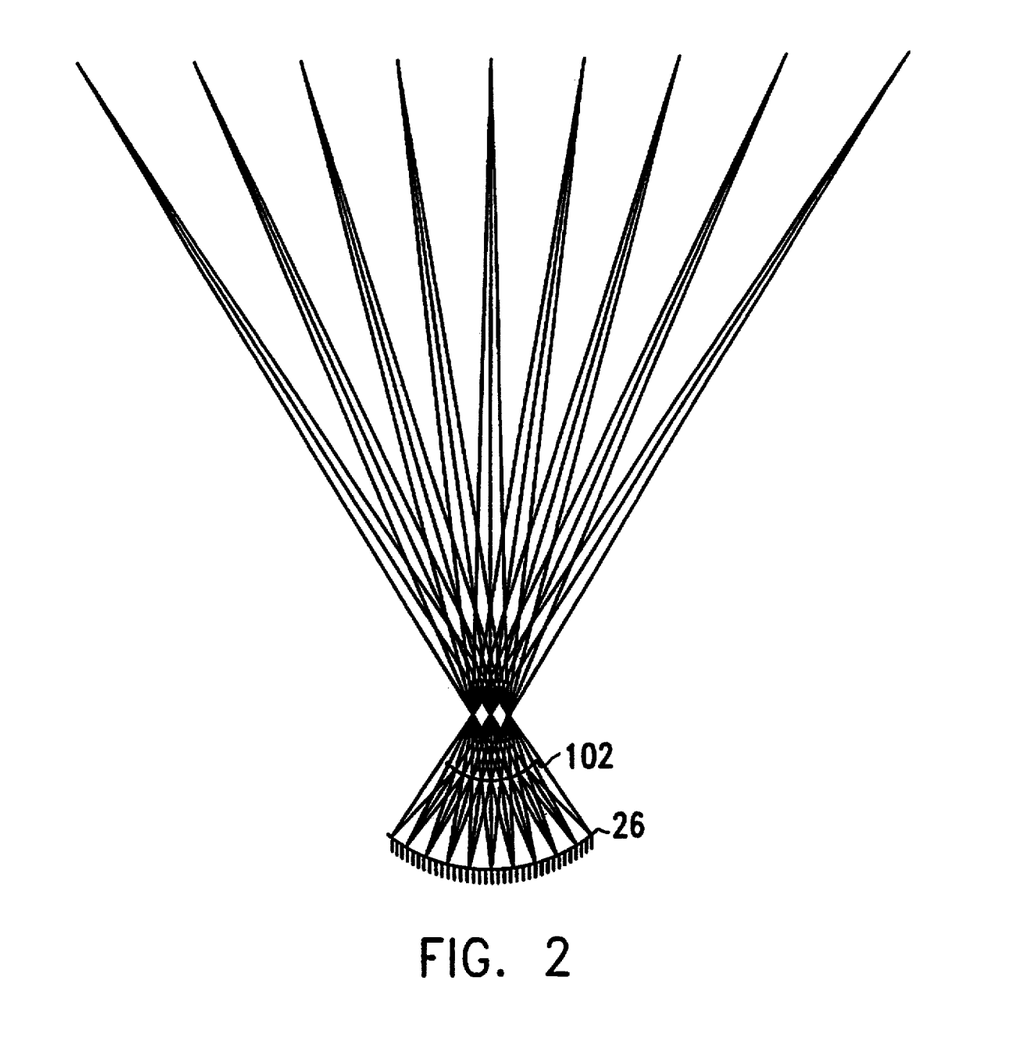
FIG. 2 shows full field full ray bundle diagrams for the strip prism design.
Figure 3A:
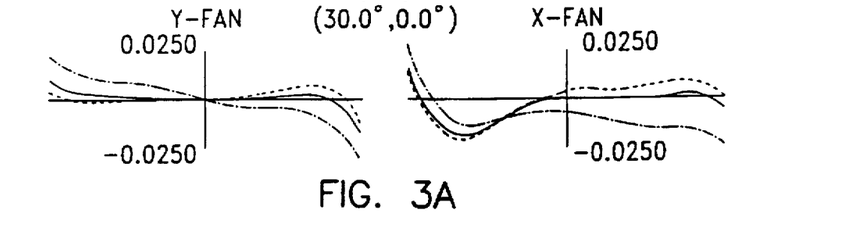
FIG. 3 shows strip prism transverse ray aberrations.
Figure 3B:
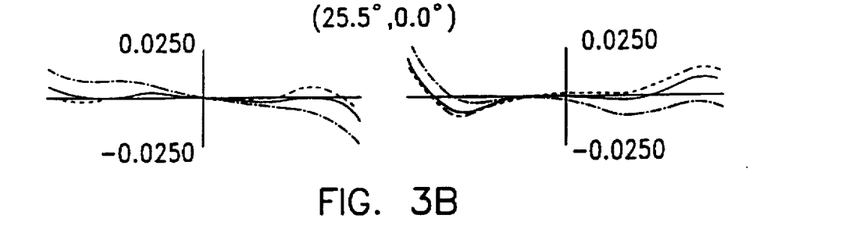
Figure 3C:
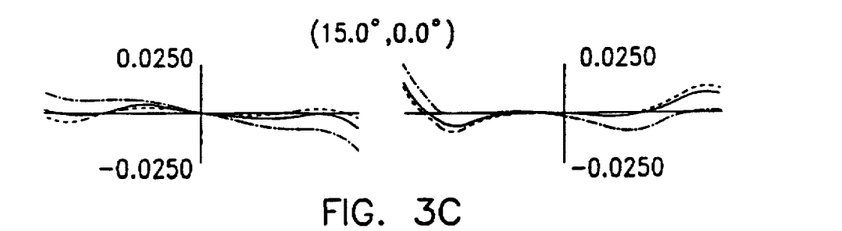
Figure 3D:
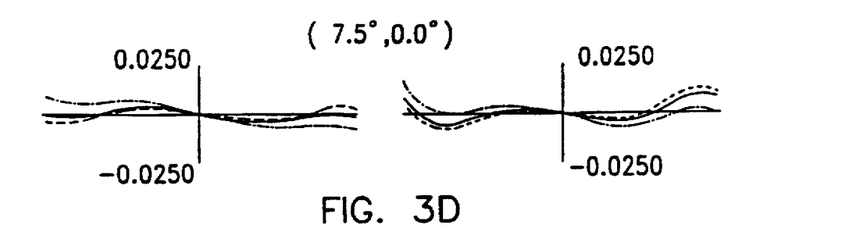
Figure 3E:
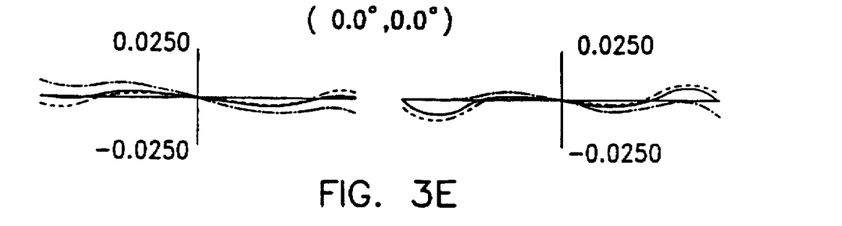

The image plane chief rays for the strip prism design are illustrated in FIG. 2 for $\Theta=0°$ to 30°. As illustrated, X=262.1 mm, Y=0.0 mm, $\Theta=31.9°$, and $X(\Theta)=F \tan \Theta \pm 1\%$. The strip prism residual transverse ray aberrations are shown in FIG. 3.

An evaluation of the strip prism design indicates that the correction at 587 nanometers is $\lambda/10$ or better for semi-fields out to 22.5°, but falls to $\lambda/4$ at 30° semi-field. The strip prism introduces a relatively small amount of primary axial and lateral chromatic aberration. On-axis there is a $\lambda/4$ focus difference between 587 and 486 nanometers. At 22.5° semi-field there is a 6 micrometers lateral spread between the focal points for 656 and 486 nanometers. This increases to 10 micrometers at 30° semi-field, about one-half the Airy disc diameter. The location of the image point along the scan line, as measured from the center of the field, follows the tangent function of the scan disc rotation angle to within 1% out to a semi-line length of 262 mm.

It may be appreciated that the location of the beam in the scan direction at any instant during the line scan will depart from its ideal location if there is any scan disc axis tilt or decenter. Other potential sources of this error include bearing jitter, motor cogging, angle position encoder error and drive electronics servo errors. The combined effects of all of these sources of error result in a horizontal scan function which is non-linear and which exhibits both systematic and random components.

Figure 4:
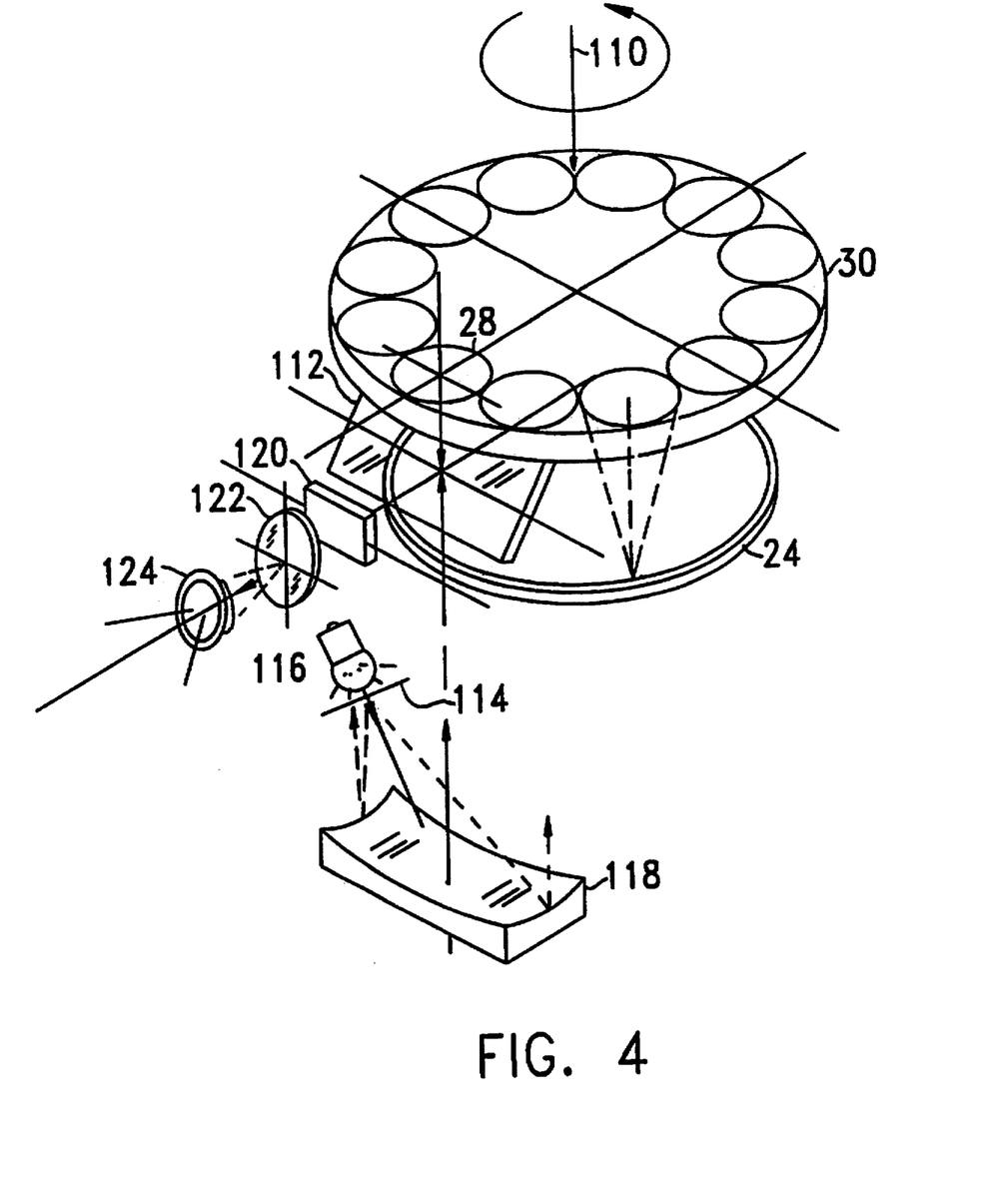
FIG. 4 shows a beam position monitoring system in accordance with the invention.

In some systems, the magnitude of the combined effects may be small enough to not require compensation. Where compensation is required, however, beam position monitoring can be achieved via implementation of a beam splitter and precision grating located parfocal to the strip mirror as shown in FIG. 4. As preferably embodied, a thin beam splitter plate 112 is located between strip mirror 24 and scan disc 30. A beam of collimated light is generated via pinhole 114, light source 116 and collimating mirror 118. The collimated light passes through beam splitter plate 112 and strikes scan disc 30 at normal incidence. The light reflected from the concave reflector 28 and beam splitter plate 112 is focused onto precision grating 120, collected by field lens 122 and transmitted to detector 124. Precision grating 120 is curved, having a radius equal to the scan disc radius, and its arc length equals that of the strip mirror. As the beam traverses the grating a clocking signal is generated which is characteristic of the system with all of its perturbations and which can be used to time the system electronic events in lieu of a fixed frequency clock.

Figure 5:
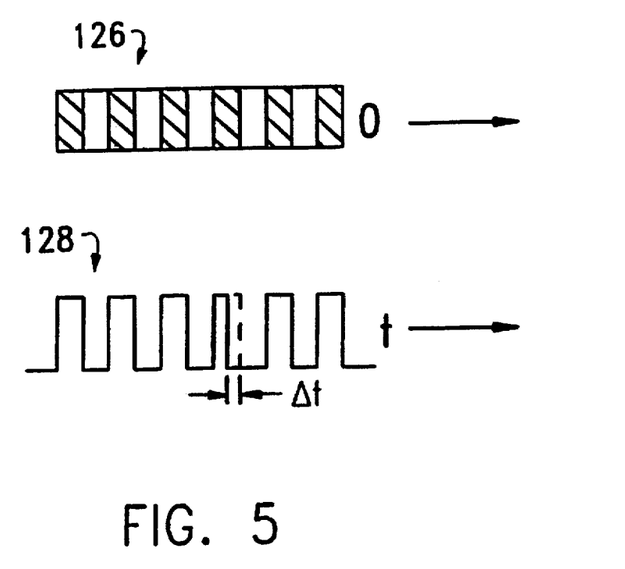
FIG. 5 shows a reticle pattern and resulting clock signal for beam position monitoring in the scan direction.

As illustrated in FIG. 5, a reticle pattern 126 provided in precision grating 120 for beam position monitoring in the scan direction will allow the scanning light spot to generate a signature system clock signal 128. Advantageously, by incorporating a suitable reticle for beam position monitoring in the scan direction and generating a clock signal which embodies all characteristics of the system, it is not necessary to incorporate special F Θ lenses.

Figure 6:
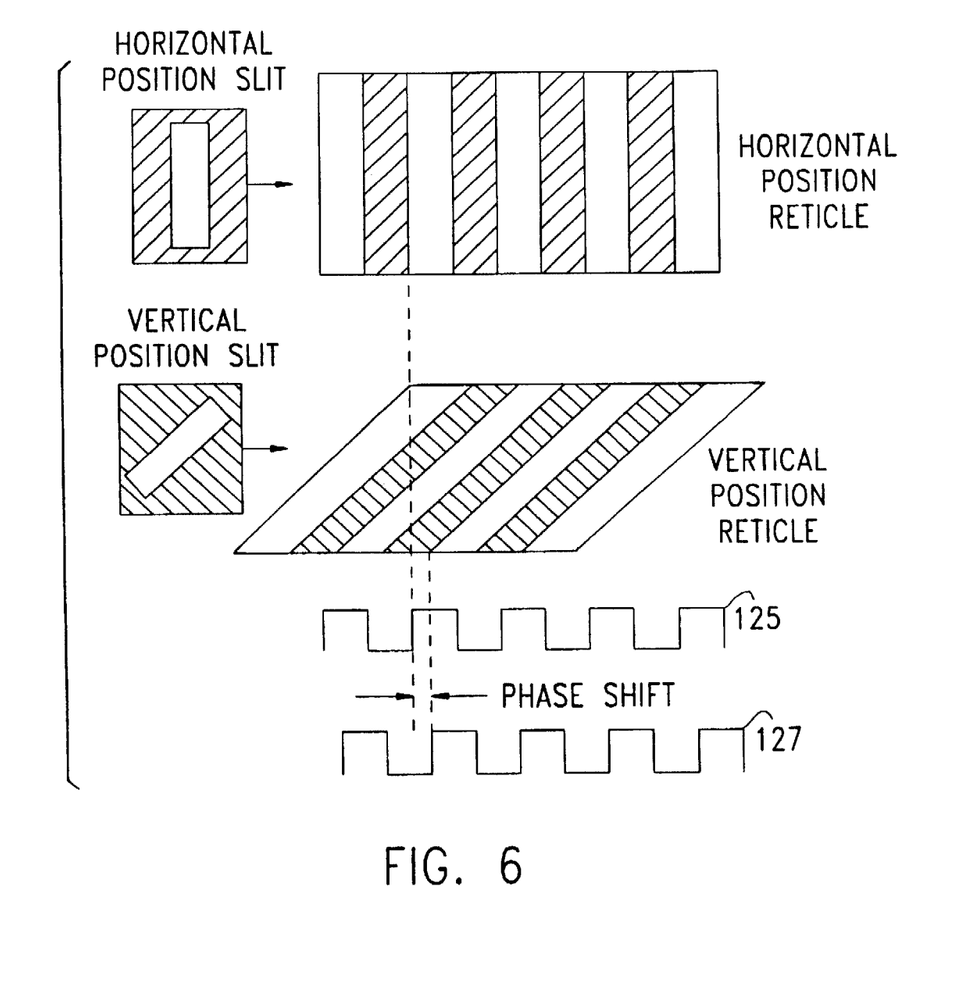
FIG. 6 shows a horizontal and vertical scan position monitor.

The beam position monitoring design illustrated in FIG. 4 can be extended to include beam position monitoring in the cross-scan direction. In this embodiment, two slightly non-parallel light beams are generated by two slits or pin holes. The horizontal position slit is oriented vertically and the vertical position slit is tilted at an angle as shown in FIG. 6. Slits have the advantage, when compared with pin holes, of producing greater illumination and therefore greater signal strength on the detectors. This yields greater position accuracy when measuring threshold crossings of the detected waveform. The two beams are focused onto corresponding reticles as shown in FIG. 6. The placement of the slits yields two beams which are displaced from one another on the reticle. The upper reticle pattern is identical to the one previously described for measuring horizontal position. The lower reticle pattern consists of slits tilted at the same angle as the source slit. Light from both beams is focused by a field lens and sent to separate detectors.

Separation of the two beams can be accomplished in one of several ways. The two beams are displaced from each other where they come to focus at the reticle. A fold mirror located just behind the reticle can be used to intercept one of the beams after it has passed through the reticle and send it to a separate field lens/detector combination. Alternatively, the two beams can be distinguished from one another by locating color filters in front of the slits (pin holes), e.g., red and green. After the two beams pass through the reticle and field lens, a dichroic beam splitter is used to separate the beams for detection.

If there is no cross-scan position error present, the output signals from the two detector channels are in phase. When a cross-scan error is present, the slit patterns shift together vertically on the reticle. This results in a phase shift of the clock signal 125 from the horizontal detector channel relative to the clock signal 127 from the vertical detector channel as shown in FIG. 6. The phase shift is proportional to the vertical displacement error of the optical beam.

Figure 7:
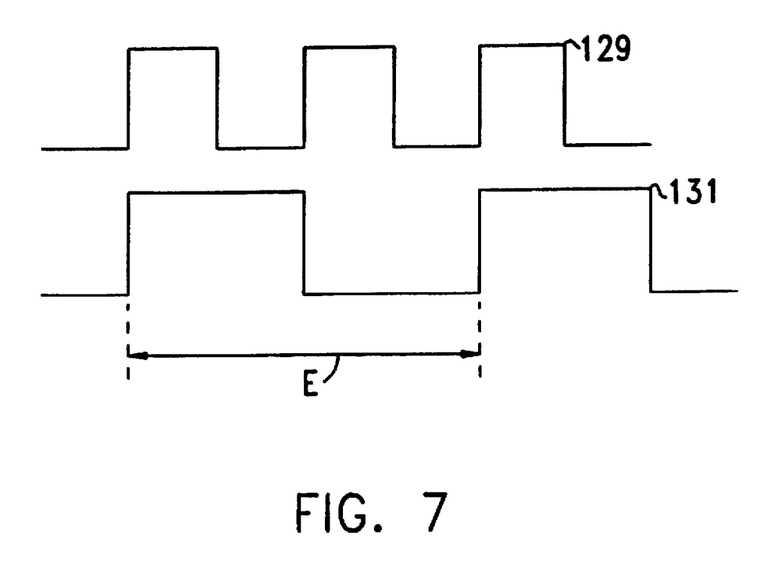
FIG. 7 shows output signals for a three pattern reticle.

If the vertical displacement error is large enough, a 360° phase shift will be produced resulting in a vertical position ambiguity. This ambiguity can be resolved by adding a third pattern to the reticle. This pattern consists of wider slits at wider spacing. This allows a larger error to be sensed as shown in FIG. 7. First vertical position clock signal 129 and second vertical position clock signal 131 provide a maximum unambiguous position error E. Thus, the maximum unambiguous position error may be increased by employing a reticle having multiple patterns.

Figure 8:
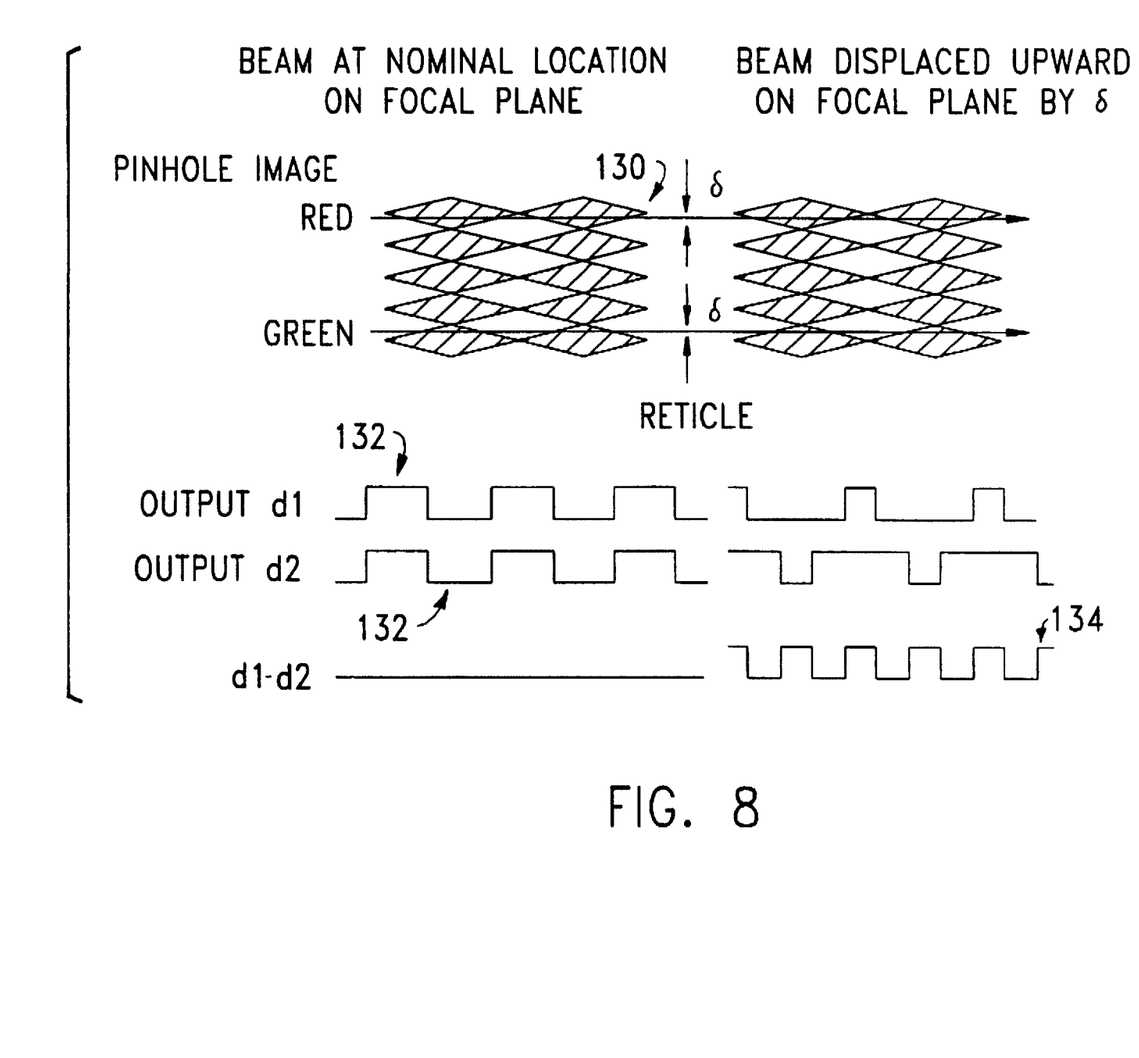
FIG. 8 shows reticle patterns and resulting clock signals for beam position monitoring in the cross-scan direction.

FIG. 8 is an alternative reticle pattern which also can provide vertical position monitoring. If there is no cross-scan position error present, the output signals from the red and green detectors are identical constant frequency clock signals 132. When a cross-scan error is present, the red and green light spots at the detector shift together radially on the reticle. The resultant clock signals generated by the detectors change and differ from one another, as shown on the right in FIG. 8. The time average difference 134 between the two clock signals is proportional to the cross-scan error. Advantageously, either of the two signals can also be used to simultaneously monitor the beam position in the scan direction.

The error in the cross-scan beam position sensed by the beam position monitor can be used to correct the beam's position line-by-line, pixel-by-pixel or at some intermediate rate. The actual sampling rate will depend on system accuracy requirements, the size and number of pixels per line, and line scan rate requirements.

The sinusoidal cross-scan displacement errors due to disc axis tilt and decenter can also be eliminated by repositioning the beam at the same frequency and amplitude and with the correct phase relationship. This can be achieved on a line-by-line basis using beam position information gathered once per line. Errors which occur at a rate higher than the line rate can be similarly corrected via multiple samples of the beam position during a line scan.

An open loop approach in which the beam position is used only at assembly to set the amplitude and phase of the beam positioner and is not part of the scanner is a viable, lower cost approach when the error is chiefly sinusoidal and occurring at the scan disc rotation frequency. This permits a relatively low frequency correction technique to be implemented.

There are several ways to reposition the light beam which are known in the art, most of them involving the movement of an optical component. In accordance with the preferred embodiment herein, the strip mirror is the optical component. Since the line correction rate can be of the order of several thousand times per second a smaller, lighter component such as the strip mirror is preferable to a larger, heavier one.

Figure 9:
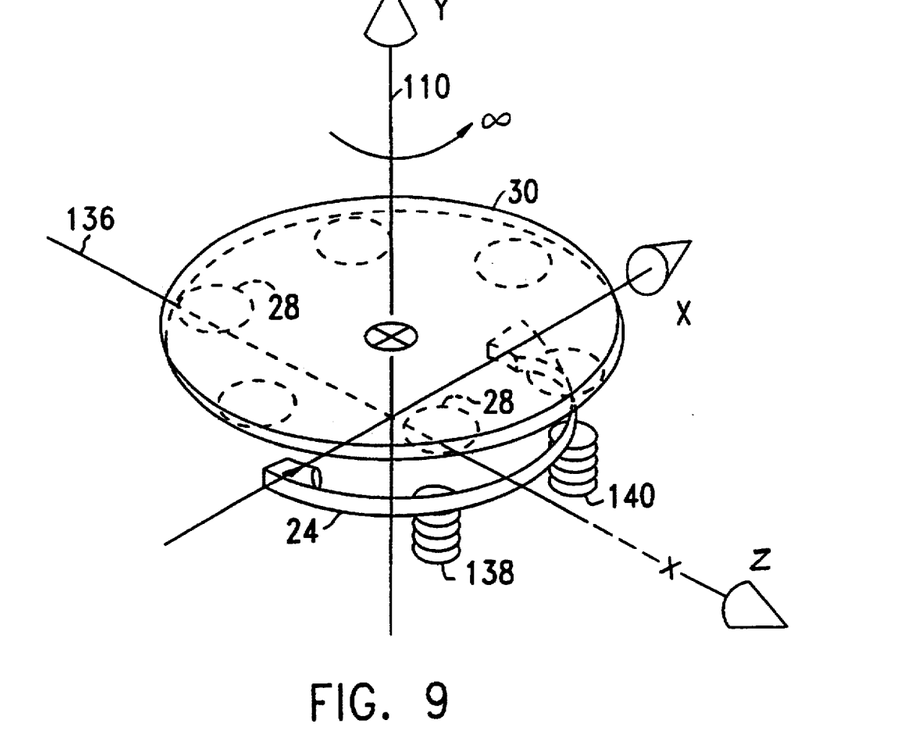
FIG. 9 shows a CVROS scanner with voice coils for movement of the strip mirror.
Figure 10:
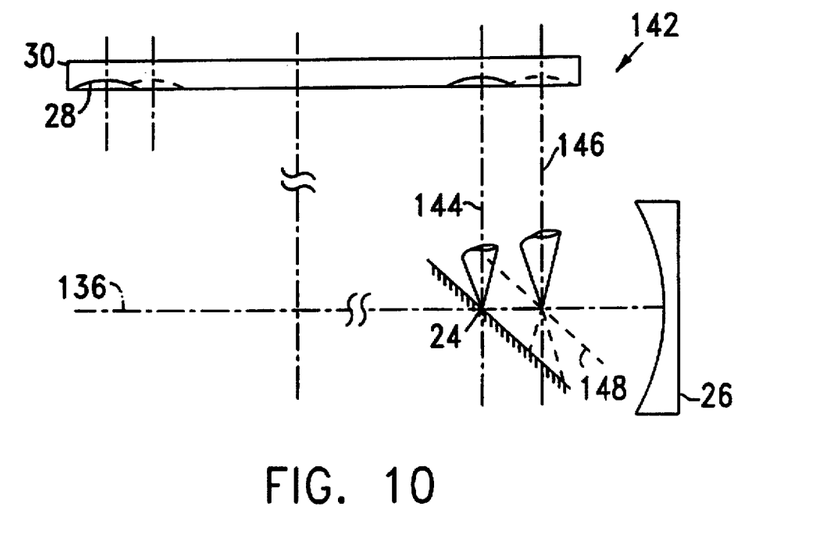
FIG. 10 shows the dithering of the strip mirror to accommodate decentering of the scan disc.

FIGS. 9 and 10 illustrate beam positioning by movement of the strip mirror. In FIG. 9, scan disc 30 is shown rotating about axis of rotation 110 at a frequency of ω and having optical axis 136. Two voice coils 138, 140, provided with a drive voltage v=v$_0$ sin ωt are connected to strip mirror 24. By translating the strip mirror vertically in synchronization with the moving light spot located at the focal point of the concave reflector 28, the cross-scan error can be eliminated. As shown in FIGS. 9 and 10 for the case of scan disc decenter, the focused light spot oscillates along a radial line 136. If the optical axis of the concave reflector, on which the concave reflector focal point is located, always intersects the strip mirror at the point of intersection with the objective mirror axis, cross-scan error will be nulled.

In FIG. 10, the decentered position of the scan disc is illustrated by dashed lines 142. The true position of the light beam is shown at 144 and the decentered position at 146. The dithered position of the strip mirror for line wobble correction is shown at dashed line 148. In the case of scan disc axis tilt, there is a residual focus error of amplitude Δz=(r–f) Θ. By making the concave reflector focal length f equal to the scan disc radius R$_D$, the focus error can also be eliminated.

The strip mirror can be driven by various means. Voice coils or a piezoelectric drive are suitable since the required displacement amplitude is typically of the order of 10 micrometers or less. Voice coils have been successfully utilized where the required displacement amplitude of the strip mirror was ±4 micrometers. A satisfactory approximation to translating the strip mirror can also be achieved by flexing it about a horizontal axis. The distance between the strip mirror and its tilt axis can be equal to the scan disc radius and yield satisfactory results for a 30 degree field.

The light beam can also be repositioned by changing its angle of incidence on the scan disc. This can be accomplished via a tipped plate located between a laser diode and a collimating lens. A tipped plate located in a converging or diverging beam displaces the virtual image of the laser point source in proportion to the plate thickness and tip angle. This in turn changes the angle of incidence at which the collimated light strikes the concave reflector of the scan disc and thereby effects a radial shift in the concave reflector focal point location at the strip mirror.

By dithering the plate tip angle in proportion to the output from the cross-scan beam position sensor, the beam position error can be nulled continuously through implementation of a servo system. By providing the means to tip the plate in the orthogonal direction, beam direction changes in the scan direction can also be effected.

The tipping plate's relative insensitivity of displacement versus angle of tilt can be a useful property when small displacements of the order of 10 micrometers are required. Also, being located near a point source object it can be very small, thereby allowing it to be dithered at high frequency.

Other means of repositioning the beam external to the scanner are also possible. For example, the laser diode itself can be mounted on a piezo-electric block and translated directly or a small, dithered fold mirror can be used in front of the diode to yield a satisfactory approximation to translation of the laser source. Techniques employed for other scanners may also be viable.

While the invention has been described in its preferred embodiments, it is to be understood that the words which have been used are words of description, rather than limitation, and that changes may be made within the purview of the appended claims without departing from the true scope and spirit of the invention in its broader aspects. For example, while beam position monitoring was described with a beam splitter and a precision grating located parfocal to the strip mirror, the precision grating can also be located parfocal to the scan line and extending over its length.

What is claimed:

1. An optical system, comprising:

a rotating scan disc including a circular array of concave reflectors on a planar surface thereof;

imaging means adapted to coincide with the scanning sweep of the concave reflectors and separated from said concave reflectors by a distance equal to the focal length of said concave reflectors;

a light source positioned to emit a light beam toward said circular array of concave reflectors to form an image redirected from said imaging means; and means for monitoring the position of said light beam during rotation of said scan disc.

2. An optical system according to claim 1, wherein said means for monitoring further comprises a beam splitter and a grating.

3. An optical system according to claim 2, wherein said grating includes a reticle pattern for generating a clock signal representing characteristics of the system.

4. An optical system according to claim 3, wherein said imaging means includes an objective mirror and a strip prism adapted to correct field curvature of said image.

5. An optical system according to claim 1, wherein said means for monitoring further comprises two non-parallel light beams.

6. An optical system according to claim 5, wherein said two non-parallel light beams are utilized to monitor beam position in both the scan and cross-scan directions.

* * * * *